United States Patent
Lee et al.

(10) Patent No.: US 10,027,438 B2
(45) Date of Patent: Jul. 17, 2018

(54) ACCESSING CP CHANNELS WITH LP TERMINALS VIA WAVEFRONT MULTIPLEXING

(71) Applicant: SPATIAL DIGITAL SYSTEMS, INC., Agoura Hills, CA (US)

(72) Inventors: Juo-Yu Lee, Camarillo, CA (US); Donald C. D. Chang, Thousand Oaks, CA (US); Tzer-Hso Lin, Chatsworth, CA (US)

(73) Assignee: SPATIAL DIGITAL SYSTEMS, INC., Agoura Hills, CA (US)

( * ) Notice: Subject to any disclaimer, the term of this patent is extended or adjusted under 35 U.S.C. 154(b) by 0 days.

(21) Appl. No.: 15/633,752

(22) Filed: Jun. 26, 2017

(65) Prior Publication Data
US 2017/0324506 A1    Nov. 9, 2017

Related U.S. Application Data

(63) Continuation of application No. 14/728,980, filed on Jun. 2, 2015, now Pat. No. 9,692,549.

(51) Int. Cl.
*H04J 14/06* (2006.01)
*H01Q 21/24* (2006.01)
*H04B 7/185* (2006.01)

(52) U.S. Cl.
CPC .......... *H04J 14/06* (2013.01); *H01Q 21/245* (2013.01); *H04B 7/18513* (2013.01); *H04B 7/18504* (2013.01)

(58) Field of Classification Search
CPC ... H04J 14/06; H01Q 21/245; H04B 7/18513; H04B 7/18504
USPC .......................................................... 455/12
See application file for complete search history.

(56) References Cited

U.S. PATENT DOCUMENTS

| | | | | |
|---|---|---|---|---|
| 3,569,958 A | * | 3/1971 | Gabriel | G01S 7/295 341/147 |
| 3,659,291 A | * | 4/1972 | Anthony | G01S 1/02 342/401 |
| 3,750,142 A | * | 7/1973 | Barnes | H03M 1/00 341/120 |
| 4,063,176 A | * | 12/1977 | Milligan | H03D 9/0633 333/238 |
| 4,194,240 A | * | 3/1980 | Davis | G01R 19/04 324/120 |

(Continued)

*Primary Examiner* — Hai V Nguyen (57) ABSTRACT

An apparatus comprises a wavefront muxing processor receiving first and second input signals to generate first and second output signals on first and second communication channels, respectively, the first and second output signals being at a common frequency slot and having relative differential amplitude and phase delays; and an amplitude and phase adjustment element located at one of the first and second communication channels to adjust the relative differential amplitude and phase delays using an adjustment amount to reduce interference in the first and second communication channels. The first output signal is a weighted sum of the first input signal and the second input signal that is phase shifted by a second phase shift. The second output signal is a weighted sum of the second input signal and the first input signal that is phase shifted by a first phase shift. The two output signals are transmitted to a transponder.

17 Claims, 9 Drawing Sheets

(56) References Cited

U.S. PATENT DOCUMENTS

| | | | | |
|---|---|---|---|---|
| 4,402,480 A * | 9/1983 | Udell | B64G 1/1021 | 244/158.1 |
| 4,672,687 A * | 6/1987 | Horton | H01Q 3/24 | 333/103 |
| 4,775,853 A * | 10/1988 | Perez Borruat | G08B 13/196 | 250/226 |
| 4,965,809 A * | 10/1990 | Endo | H04B 7/002 | 342/353 |
| 5,081,708 A * | 1/1992 | Sacchi | H03G 3/10 | 327/72 |
| 5,377,232 A * | 12/1994 | Davidov | H04B 1/56 | 370/206 |
| 5,926,745 A * | 7/1999 | Threadgill | H04B 7/18539 | 455/12.1 |
| 5,995,258 A * | 11/1999 | Weber | H04B 10/25752 | 398/1 |
| 6,058,307 A * | 5/2000 | Garner | H04B 7/18539 | 455/428 |
| 6,208,307 B1 * | 3/2001 | Frisco | H01Q 1/007 | 342/363 |
| 6,252,915 B1 * | 6/2001 | Mollenkopf | H03G 3/3042 | 375/297 |
| 6,694,137 B2 * | 2/2004 | Sharon | H01Q 1/288 | 370/316 |
| 6,748,597 B1 * | 6/2004 | Frisco | G06Q 30/02 | 348/E7.05 |
| 6,751,801 B1 * | 6/2004 | Frisco | H01Q 1/28 | 343/705 |
| 7,046,223 B2 * | 5/2006 | Hashimoto | G09G 3/3611 | 345/211 |
| 7,155,168 B2 * | 12/2006 | McLain | H04B 7/18508 | 455/67.11 |
| 7,174,107 B2 * | 2/2007 | Boroditsky | H04B 10/07951 | 398/152 |
| 7,193,872 B2 * | 3/2007 | Siri | H02M 3/33592 | 363/95 |
| 7,436,370 B2 * | 10/2008 | Blanton | H01Q 21/061 | 342/359 |
| 7,737,904 B2 * | 6/2010 | Rao | H01Q 1/288 | 343/772 |
| 7,808,323 B2 * | 10/2010 | Takinami | G05F 1/565 | 330/296 |
| 7,903,440 B2 * | 3/2011 | Yang | H02M 3/33592 | 363/127 |
| 8,116,387 B2 * | 2/2012 | Rofougaran | H04L 27/361 | 375/259 |
| 8,190,085 B2 * | 5/2012 | Barak | H04B 7/18513 | 455/12.1 |
| 8,369,772 B2 * | 2/2013 | Petruzzelli | H04H 40/90 | 370/343 |
| 8,494,373 B2 * | 7/2013 | Buelow | H04B 10/2569 | 398/152 |
| 8,538,326 B2 * | 9/2013 | Chang | H01Q 9/0407 | 455/12.1 |
| 8,594,587 B2 * | 11/2013 | Jackson | H01P 1/2138 | 455/550.1 |
| 8,646,010 B2 * | 2/2014 | Bengeult | H04B 7/18508 | 455/12.1 |
| 8,656,436 B2 * | 2/2014 | Kurten | H04H 40/90 | 725/69 |
| 8,786,759 B2 * | 7/2014 | Wang | G02B 3/14 | 348/344 |
| 8,818,457 B2 * | 8/2014 | Besoli | H01Q 9/0435 | 343/702 |
| 8,862,050 B2 * | 10/2014 | Chang | H04B 7/10 | 455/101 |
| 8,873,182 B2 * | 10/2014 | Liao | G11B 20/10268 | 360/53 |
| 8,971,424 B2 * | 3/2015 | Rosenhouse | H04L 25/0232 | 348/725 |
| 9,065,591 B2 * | 6/2015 | Chang | H04B 7/10 | |
| 9,112,527 B2 * | 8/2015 | Nagaraj | H02P 8/22 | |
| 9,509,937 B2 * | 11/2016 | Easterling | H04N 5/50 | |
| 9,537,212 B2 * | 1/2017 | Rosen | H01Q 3/22 | |
| 9,559,416 B2 * | 1/2017 | Chang | H01Q 9/0407 | |
| 9,692,549 B2 * | 6/2017 | Lee | H04J 14/06 | |
| 9,711,100 B2 * | 7/2017 | Choi | G09G 3/3614 | |
| 9,762,309 B2 * | 9/2017 | Chang | H04B 7/18515 | |
| 2002/0118725 A1 * | 8/2002 | Mollenkopf | H04B 7/18543 | 375/141 |
| 2002/0151278 A1 * | 10/2002 | McLain | H04B 7/18508 | 455/67.11 |
| 2002/0167449 A1 * | 11/2002 | Frazita | H01Q 1/42 | 343/756 |
| 2003/0035386 A1 * | 2/2003 | Sullivan | H04B 7/18584 | 370/316 |
| 2003/0192052 A1 * | 10/2003 | Frisco | G06Q 30/02 | 725/76 |
| 2003/0200546 A1 * | 10/2003 | Keen | G06Q 30/02 | 725/76 |
| 2003/0200547 A1 * | 10/2003 | Frisco | G06Q 30/02 | 725/77 |
| 2003/0203733 A1 * | 10/2003 | Sharon | H01Q 1/288 | 455/427 |
| 2003/0229897 A1 * | 12/2003 | Frisco | G06Q 30/02 | 725/76 |
| 2003/0233658 A1 * | 12/2003 | Keen | H04N 21/441 | 725/76 |
| 2004/0078821 A1 * | 4/2004 | Frisco | B64D 11/0015 | 725/76 |
| 2004/0196813 A1 * | 10/2004 | Ofek | H01Q 1/246 | 370/334 |
| 2004/0196834 A1 * | 10/2004 | Ofek | H01Q 1/246 | 370/352 |
| 2005/0232640 A1 * | 10/2005 | Boroditsky | H04B 10/07951 | 398/152 |
| 2006/0039419 A1 * | 2/2006 | Deshi | H01C 17/242 | 372/9 |
| 2006/0049977 A1 * | 3/2006 | Vacanti | G01S 7/006 | 342/121 |
| 2006/0141930 A1 * | 6/2006 | Keen | H04B 7/18508 | 455/12.1 |
| 2006/0142002 A1 * | 6/2006 | Funderburk | B64D 11/0015 | 455/431 |
| 2006/0143660 A1 * | 6/2006 | Logan | H04N 21/41422 | 725/76 |
| 2006/0143661 A1 * | 6/2006 | Funderburk | B64D 11/0015 | 725/76 |
| 2006/0143662 A1 * | 6/2006 | Easterling | H04N 5/50 | 725/76 |
| 2006/0234700 A1 * | 10/2006 | Funderburk | H04B 7/18508 | 455/431 |
| 2008/0218424 A1 * | 9/2008 | Blanton | H01Q 21/061 | 343/756 |
| 2009/0059101 A1 * | 3/2009 | Wang | G02B 3/14 | 349/2 |
| 2009/0096857 A1 * | 4/2009 | Frisco | H04B 7/18508 | 348/14.02 |
| 2009/0309801 A1 * | 12/2009 | Rao | H01Q 1/288 | 343/779 |
| 2010/0136902 A1 * | 6/2010 | Barak | H04B 7/10 | 455/12.1 |
| 2011/0219409 A1 * | 9/2011 | Frisco | H04N 7/18 | 725/77 |
| 2011/0229143 A1 * | 9/2011 | Buelow | H04B 10/2569 | 398/116 |
| 2011/0243043 A1 * | 10/2011 | Jackson | H01P 1/2138 | 370/297 |
| 2011/0243562 A1 * | 10/2011 | Jackson | H01P 1/2138 | 398/65 |
| 2011/0296470 A1 * | 12/2011 | Kurten | H04H 20/63 | 725/70 |
| 2012/0026937 A1 * | 2/2012 | Chang | H01Q 9/0407 | 370/316 |
| 2012/0183295 A1 * | 7/2012 | Chang | H04B 7/10 | 398/65 |
| 2013/0072136 A1 * | 3/2013 | Besoli | H01Q 9/0435 | 455/90.2 |

(56) References Cited

U.S. PATENT DOCUMENTS

| | | | |
|---|---|---|---|
| 2013/0302034 A1* | 11/2013 | Chang | H01Q 9/0407 |
| | | | 398/65 |
| 2014/0198709 A1* | 7/2014 | Chang | H04B 7/18526 |
| | | | 370/312 |
| 2014/0241239 A1* | 8/2014 | Chang | H04B 7/18506 |
| | | | 370/316 |
| 2015/0003830 A1* | 1/2015 | Chang | H04B 7/10 |
| | | | 398/65 |
| 2015/0263820 A1* | 9/2015 | Chang | H04B 7/10 |
| | | | 370/316 |
| 2015/0263821 A1* | 9/2015 | Lee | H04J 14/06 |
| | | | 370/316 |
| 2015/0358071 A1* | 12/2015 | Chang | H04B 7/18506 |
| | | | 370/325 |
| 2016/0299339 A1* | 10/2016 | Klapp | G02B 3/0081 |

* cited by examiner

ACCESSING CP CHANNELS WITH LP TERMINALS VIA WAVEFRONT MULTIPLEXING

CROSS REFERENCE TO RELATED APPLICATIONS

This application is a continuation of application Ser. No. 14/728,980 filed on Jun. 2, 2015, entitled "Accessing CP channels with LP Terminals via Wavefront Multiplexing". This application is related to application Ser. No. 13/172,620, filed on Jun. 29, 2011, entitled "Accessing LP Transponders with CP Terminals via Wavefront Multiplexing Techniques", now U.S. Pat. No. 8,538,326, issued on Sep. 17, 2013.

BACKGROUND OF THE INVENTION

Presented are methods that enable linearly-polarized ground terminals to access circularly-polarized channels through wavefront multiplexing techniques. This invention comprises conventional ground terminals, a unique polarization alignment processor on the transmitting side and feedback channel. As a result of this invention, teleport operators can gain greater flexibility in how they manage their assets, and so can users in how they access available communication resources.

This invention also relates to methods that annul the interference of undesired circularly-polarized signals to the intended channel. A probing signal known to feedback terminals is exploited such that the differentials in signal propagation paths can be equalized by the unique polarization alignment processor and the interference due to undesired signals is annulled.

FIELD OF THE INVENTION

The present invention relates to methods for enabling linearly-polarized (LP) ground terminals to access circularly-polarized (CP) channels. It is also related to wavefront multiplexing/de-multiplexing (WF muxing/demuxing) technologies.

The present invention relates to radio frequency communication devices and communication architectures that comprise ground terminals, communication assets and channels. More specifically, this invention allows ground terminals with linear polarization format to communicate with communication assets of circular polarization format via wavefront multiplexing techniques. This offers tremendous advantages including, but not limited to, improved flexibility and increased efficiency of existing assets.

DESCRIPTION OF THE PRIOR ART

It is common practice in utilization of communication links to equip terminals and communication assets with antennas of compatible polarization formats. It is generally true that LP terminals access LP channels, and CP terminals access CP channels. One says that linear polarization and circular polarization are incompatible polarization formats. As the asset changes its polarization format, so does the terminal accordingly. This happens, for instance, when LP terminals switch services from a provider with LP satellites to another one with CP satellites. Then the antenna polarization formats require reconfiguration from LP to CP. One main reason to reconfigure polarization formats is to prevent 3 dB signal-to-noise ratio (SNR) loss due to polarization incompatibility between the ground terminals and the communication assets. The radiation patterns emanating from LP terminals and incident on CP assets have also been treated "unintelligible", or interference/noise, which also serve as a second reason that the polarization formats of terminals and transponders remain compatible in conventional communication architectures.

Linear polarization has two complimentary formats, one of which is vertical polarization (VP) and another is horizontal polarization (HP). Signals conditioned on these two formats have 90 degree difference in space. Specifically, a signal with VP format has electrical field aligning with the vertical direction; and a signal with HP format has electrical field aligning with the horizontal direction. The vertical direction represents 90 degree difference with respect to the horizontal one. One should note that the vertical and horizontal directions are both defined with respect to the direction of electromagnetic wave propagation. In free space, the wave moves along the line perpendicular to said vertical and horizontal directions.

Due to the particular said configuration of electromagnetic wave propagation directions, it is essential for ground terminals and communication assets in conventional architectures to be aligned in their polarization. In other words, for LP ground terminals and LP assets to communicate successfully, their VP directions need to be aligned and so do their HP directions.

As the VP and HP signals have identical strength but exactly 90 degree difference in time, the overall effect stimulates an electrical field that rotates in space with respect to the propagation direction. The VP signal may have 90 degrees in advance of or behind the HP one, which results in right-hand circularly polarized (RHCP) or left-hand circularly polarized (LHCP) formats. RHCP and LHCP are two complementary formats of circular polarization.

The main property of a CP signal is its handed-ness, which can be RHCP or LHCP. For CP ground terminals and CP assets to communicate successfully, their VP and HP directions need not be aligned respectively. In other words, there is no stringent requirement of aligned polarization in CP communication links as seen in LP ones. On the contrary, there are tremendous advantages of enabling LP ground terminals to access CP communication assets, thanks to the considerable reduction in the cost of mechanically realigning polarization.

SUMMARY OF THE INVENTION

This invention presents methods taking advantage of polarization incompatibility (LP vs. CP) to access available communication assets when the ground terminals are not polarization compatible. Disclosed herein are the operation concepts and associated mechanisms for LP terminals to access CP communication assets whose availability is limited.

Essential to this invention is the class of wavefront muxing techniques that make the following scenarios possible: (1) a LP ground terminal successfully accesses a RHCP channel and introduces low interference to adjacent LHCP channel in the same frequency slot; (2) a LP ground terminal successfully accesses a LHCP channel and introduces low interference to adjacent RHCP channel in the same frequency slot; and (3) a LP ground terminal successfully and concurrently carries two signals, one of which can access a RHCP channel and another can access an adjacent LHCP channel in the same frequency slot, without undesired mutual interference.

For LP ground terminals to successfully access CP channels via wavefront muxing techniques, these terminals transmit probing signals, monitor the level of leakage in authorized channels through feedback terminals and then optimize the transmitted waveforms on the transmitting side. The optimized waveforms introduce no interference of significant level to unauthorized channels.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, with emphasis instead being placed on the principles of the disclosure. In the drawings.

DETAILED DESCRIPTION

The present invention relates to a communication system that comprises LP ground terminal on the transmitting side, CP channels in RHCP and LHCP formats and CP feedback channels. Due to the agreement between communication service providers and users, the LP ground terminal may only be allowed to either (1) access the RHCP channel without interfering the adjacent LHCP channel in the same frequency slot, or (2) access the LHCP channel without interfering the adjacent RHCP channel in the same frequency slot.

We shall use CP transponders on satellites in many examples, exemplifying operational principles and associated methods and apparatus. They can be applied to UAV-based communications systems, terrestrial-based point-to-point links, point-to-multipoint links, or links via relays.

The present invention relates to LP ground terminals that have VP and HP feeds. The LP ground terminals are equipped with wavefront muxing processor and polarization-conversion element or polarization realignment element. The input signals of the wavefront muxing processor are transformed and then conditioned in VP and HP formats in the ideal case, thus yielding either RHCP or LHCP waveforms.

In reality, signals conditioned in VP and HP formats may be amplified in magnitude and shifted in phase, yielding right-hand elliptically-polarized (RHEP) or left-hand elliptically-polarized (LHEP) waveforms. Using RHEP waveforms immediately introduces undesired interference to the LHCP channel if the ground terminal is only permitted to access the RHCP channel. Similarly, using LHEP waveforms immediately introduces undesired interference to the RHCP channel if the ground terminal is only permitted to access the LHCP channel. Therefore, the LP ground terminal requires adjustment, namely "polarization-realignment", to re-format the elliptically-polarized waveforms toward circularly-polarized waveforms.

Embodiment 1

Figure 1:
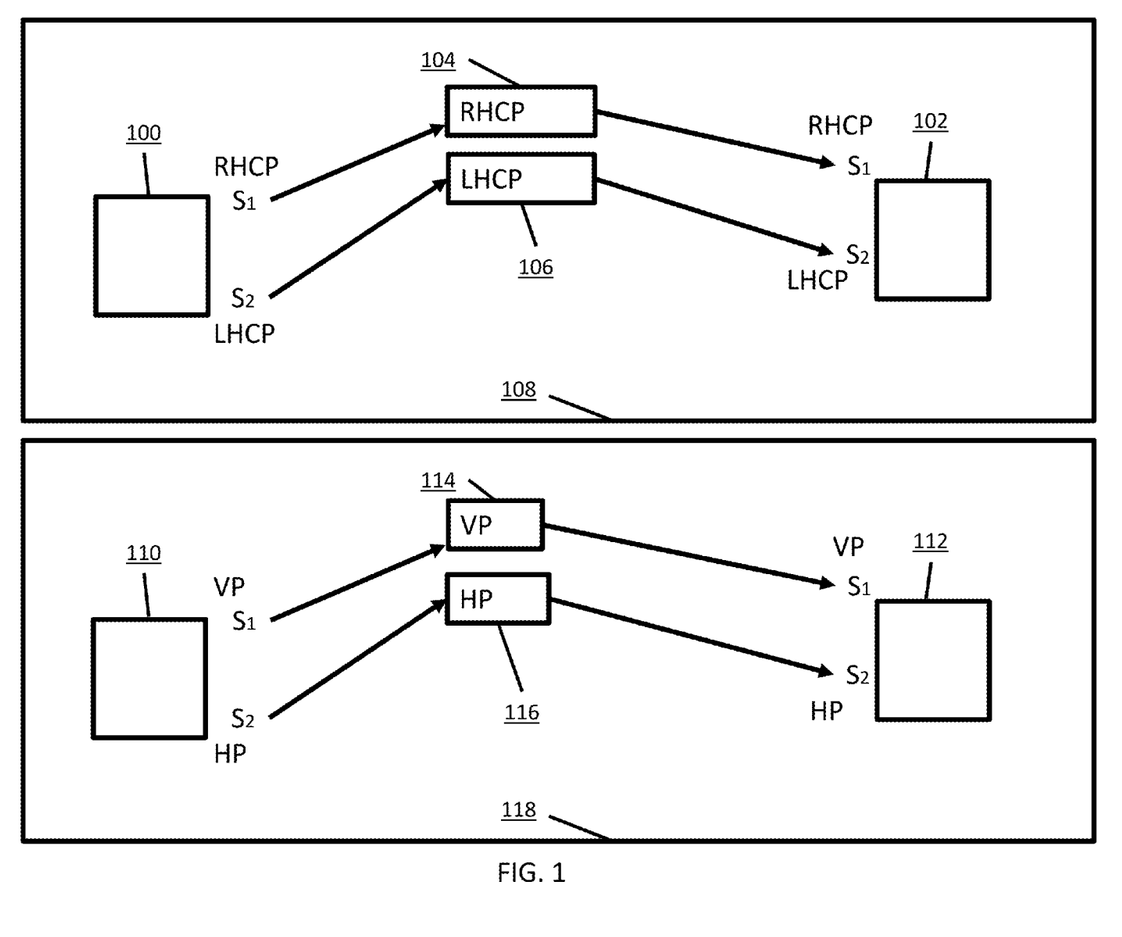
FIG. 1 illustrates conventional techniques that (1) enable CP ground terminals to access CP channels, through which the signals reach a remote CP receiving device, or (2) enable LP ground terminals to access LP channels, through which the signals reach a remote LP receiving device.

FIG. 1 illustrates conventional techniques of enabling ground terminals to access communication assets. Panel 108 shows a communication link, in which a CP ground terminal 100 accessing a CP asset establishes communication with the CP receiving device 102 through the RHCP channel 104 and/or the LHCP channel 106.

Panel 118 shows another communication link, in which a LP ground terminal 110 accessing an LP asset establishes communication with the LP receiving device 112 through the VP channel 114 and/or the HP channel 116.

If users of the ground terminal 100 intend to switch service from CP assets to LP assets, the conventional techniques require change of polarization formats, which indicates transformation of ground terminal 100 with CP formats to ground terminal 110 with LP formats.

If users of the ground terminal 110 intend to switch service from LP assets to CP assets, the conventional techniques require change of polarization formats, which indicates transformation of ground terminal 110 with LP formats to ground terminal 100 with CP formats.

Figure 2:
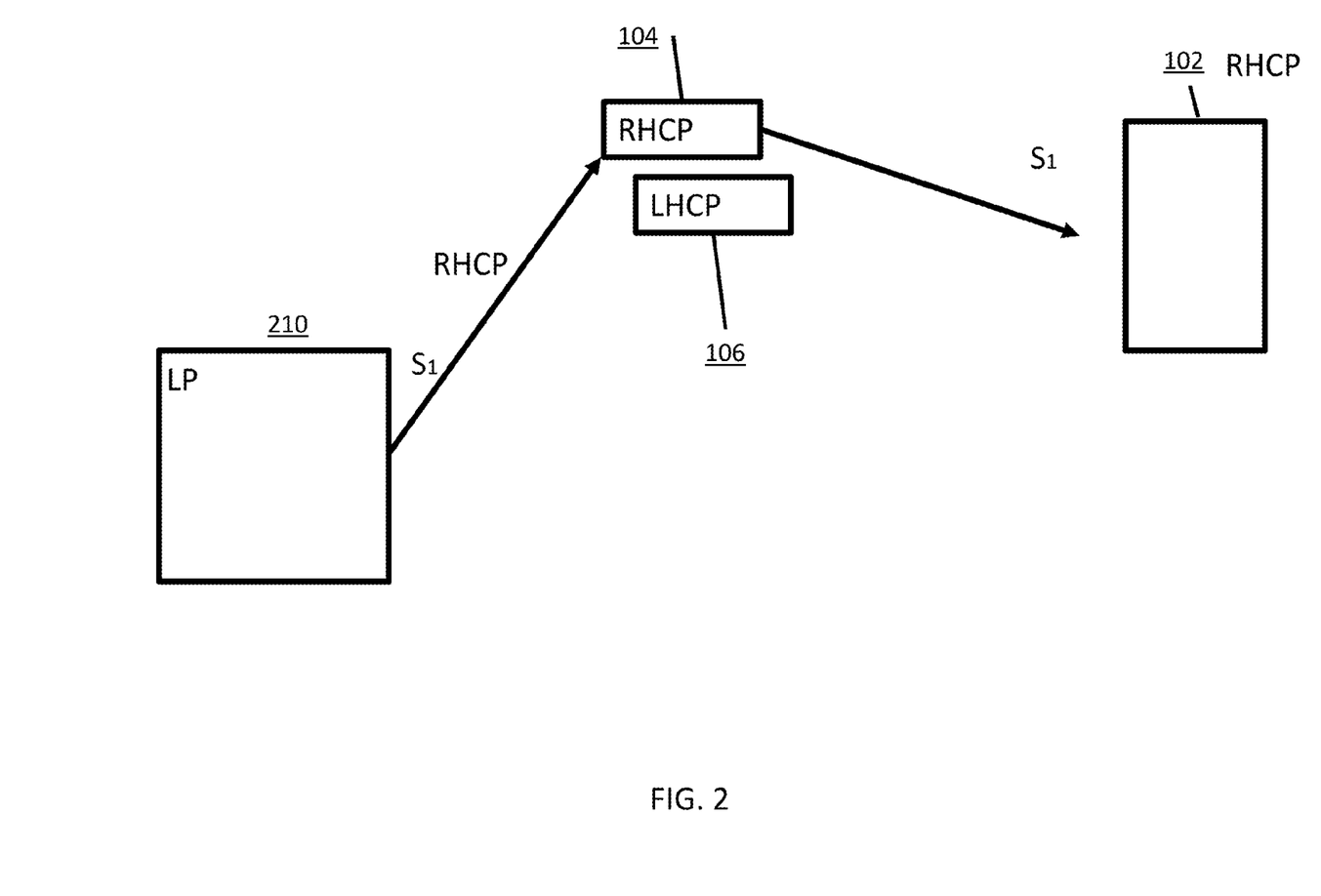
FIG. 2 illustrates a communication system in an ideal scenario, in which a LP ground terminal accessing CP channels transmits RHCP waveforms via wavefront muxing to a remote RHCP receiving device only through the RHCP channel while causing no interference to the LHCP channel.

The present invention relates to a class of novel solutions to communication service switching and other pertinent applications. FIG. 2 illustrates an ideal scenario, in which a LP ground terminal 210 that not only resembles the LP ground terminal 110, but also has additional features that can be made possible by wavefront muxing. The LP ground terminal 210 transmits RHCP waveform $S_1$ through its LP feeds. The LP ground terminal 210 can access a CP asset identical to the one in FIG. 1. The transmitted RHCP waveform only occupies the RHCP channel 104, but has no appearance in the LHCP channel 106. The transmitted RHCP waveform $S_1$ is received by the RHCP device 102.

Figure 3:
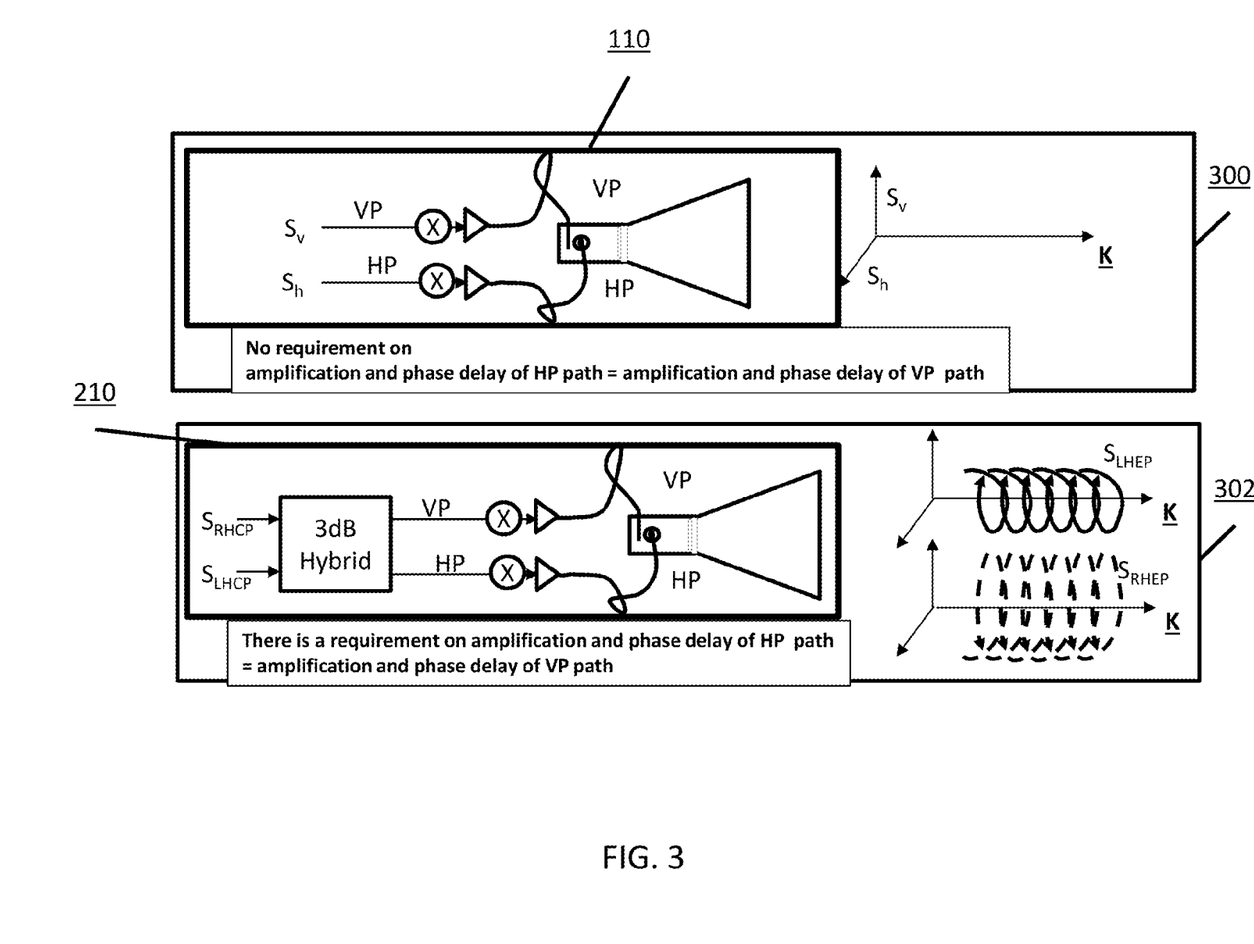
FIG. 3 illustrates one LP ground terminal that transmits VP and HP waveforms, and another LP ground terminal that transmits RHCP and LHCP waveforms. The second LP ground terminal generates CP waveforms through a wavefront muxing processor that has function of 3 dB-hybrid.

FIG. 3 depicts two LP ground terminals in different configurations. Depicted in panel 300 is LP ground terminal 110 that has a horn with VP and HP feeds. Signal through the VP path experiences the amplification and phase delay identical to that experienced by the signal through the HP path. There is no requirement on adjustment of amplitude (A) and phase ($\Phi$) of signals $S_v$ and $S_h$.

FIG. 3 also depicts panel 302 that shows LP ground terminal 210 comprising a wavefront muxing processor with 3 dB-hybrid function and a horn with VP and HP feeds. The wavefront muxing processor takes two signals $S_{RHCP}$ and $S_{LHCP}$ as input. Let v denote the VP direction and h denote the HP direction. One output of the wavefront muxing processor represents the superposition $(S_{RHCP}+iS_{LHCP})/\sqrt{2}v$, and another output of the wavefront muxing processor represents the superposition $(S_{LHCP}+iS_{RHCP})/\sqrt{2}h$. Therefore, the signal $S_{RHCP}$ has a VP component $S_{RHCP}/\sqrt{2}v$ and a HP component $iS_{RHCP}/\sqrt{2}h$. Both components have identical magnitude, but the HP component has a phase 90 degrees ahead of that of the VP component. This indicates that the LP ground terminal effectively converts and transmits the signal $S_{RHCP}$ in RHCP format. Similarly, the signal $S_{LHCP}$ has a VP component $iS_{LHCP}/\sqrt{2}v$ and a HP component $S_{LHCP}/\sqrt{2}h$. Both components have identical magnitude, but the VP component has a phase 90 degrees ahead of that of the HP component. This indicates that the LP ground terminal effectively converts and transmits the signal $S_{LHCP}$ in LHCP format. Effectively, an aggregated waveform is thus formed such that (1) it has a first component in RHCP format, which only occupies the RHCP channel but has no appearance in the LHCP channel, and (2) it also has a second component in LHCP format, which only occupies the LHCP but has no appearance in the RHCP channel.

If there is imbalance between the HP and the VP paths, there is a requirement of compensation on amplification and phase delay of both paths. Let a complex-valued parameter $\alpha$ denote the relative imbalance of amplification and phase delay on the HP path with respect to the VP path. Without loss of generality, the VP-output of the wavefront muxing processor can still be treated as $(S_{RHCP}+iS_{LHCP})/\sqrt{2}v$, and the HP-output of the wavefront muxing processor can be represented by $\alpha(S_{LHCP}+iS_{RHCP})/\sqrt{2}h$. Effectively, the $S_{RHCP}$ signal appears in the format $S_{RHCP}v+i\alpha S_{RHCP}h$, which indicates a right-hand elliptically-polarized (RHEP) waveform. Concurrently, the $S_{LHCP}$ signal appears in the format $i\alpha S_{LHCP}v+S_{LHCP}h$, which indicates a left-hand elliptically-polarized (LHEP) waveform. The RHEP waveform not only occupies the RHCP channel as the primary signal but also appears in the LHCP channel as leakage. Concurrently, the LHEP waveform not only occupies the LHCP channel as the primary signal but also appears in the RHCP channel as leakage. If users of the LP ground terminal are only authorized to access the RHCP channel, the RHEP signal without being compensated appropriately would likely cause unwanted interference to the LHCP channel, which commits unauthorized access. Likewise, if users of the LP ground terminal are only authorized to access the LHCP channel, the LHEP signal without being compensated appropriately would likely cause unwanted interference to the RHCP channel, which also commits unauthorized access. Hence, it is necessary to minimize the leakage effect introduced by the imbalance parameter $\alpha$ in order to ensure authorized access.

Figure 4:
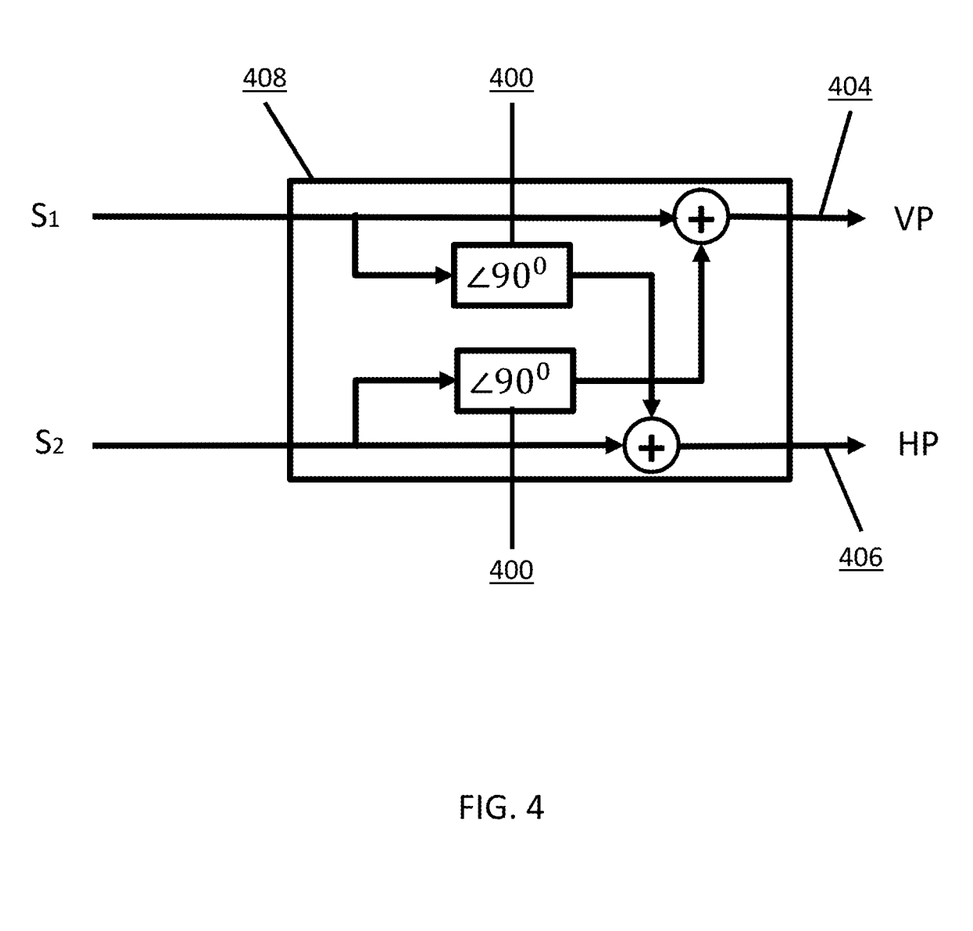
FIG. 4 depicts a wavefront muxing processor that has function of 3 dB-hybrid and conditions two signals in VP and HP formats concurrently.

FIG. 4 depicts a wavefront muxing processor 408 that has function of 3 dB-hybrid. A first output 404 of processor 408 comprises a first input $S_1$ and a phase-shifted (through device 400 increasing phase by 90 degrees) version of a second input $S_2$. A second output 406 of processor 408 comprises $S_2$ and a phase-shifted (through device 400 increasing phase by 90 degrees) version of $S_1$. In the context of wavefront muxing, the signal $S_1$ resides on a distribution pattern, or "wavefront", by "1" in output 404 and "i" in output 406. Concurrently, the signal $S_2$ resides on another distribution pattern, or "wavefront", by "1" in output 406 and 'i' in output 404. Wavefront muxing takes place through processor 408 through two wavefronts $[1\ i]^T$ and $[i\ 1]^T$, in which "T" represents matrix transposition and the $1^{st}$ ($2^{nd}$) entry in each vector represents the weighting factor introduced in output 404 (406). Hence, output 404 constitutes a weighted sum of two input signals $S_1$ and $S_2$, and output 406 constitutes another weighted sum of these two input signals. We say that the two signals $S_1$ and $S_2$ are wavefront muxed by the processor 408, and the outputs 404 and 406 constitute two wavefront muxed signals, respectively.

Suppose the input signal $S_1$, after proper transformation, is authorized to access the RHCP channel, and the signal $S_2$, after proper transformation, is authorized to access the LHCP channel. By the same arguments illustrated in FIG. 3, the output signal 404 shall feature VP formats and the output signal 406 shall feature HP formats. Specifically, output signal 404 represents the superposition $(S_1+iS_2)/\sqrt{2}v$, and output signal 406 represents the superposition $(S_2+iS_1)/\sqrt{2}h$.

Figure 5:
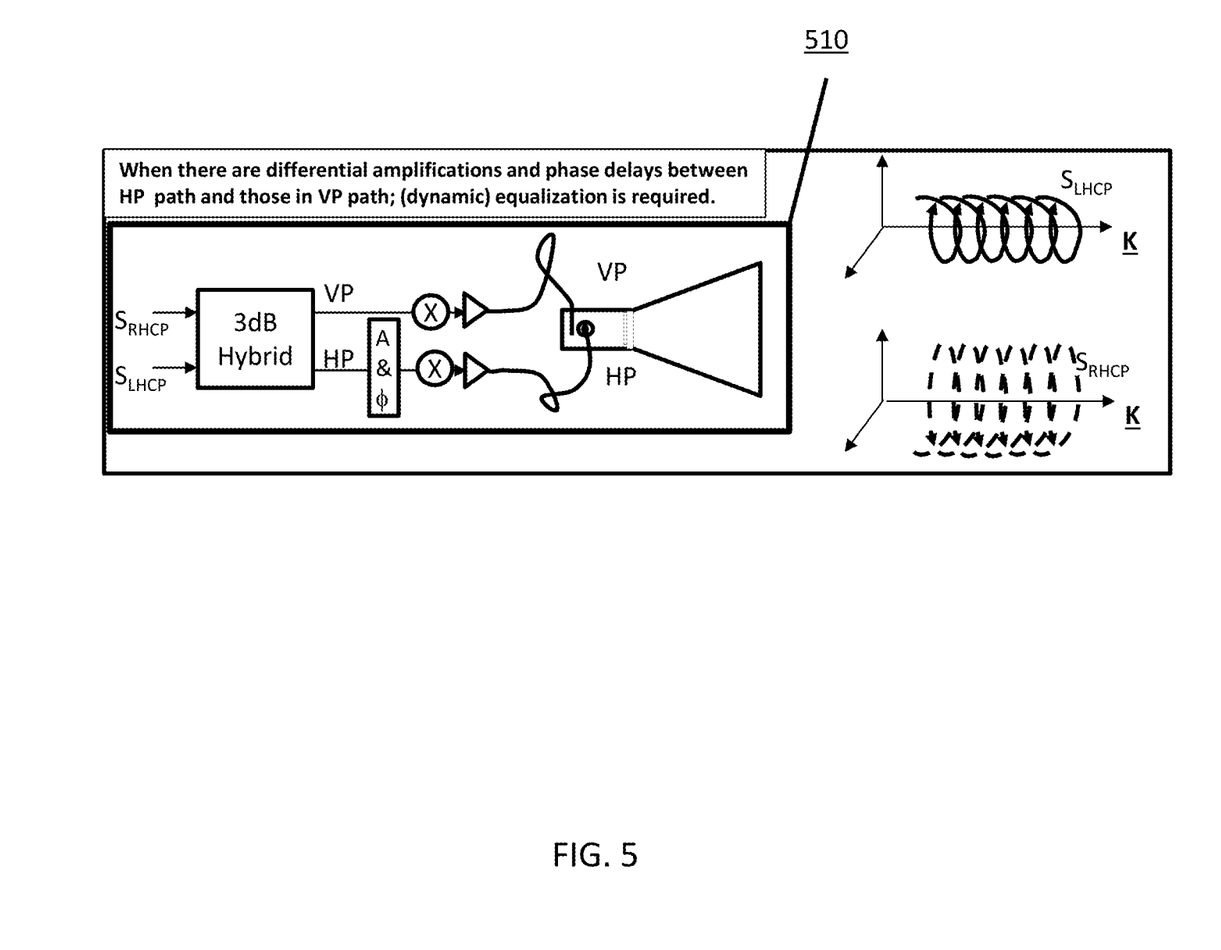
FIG. 5 depicts a LP ground terminal equipped with a wavefront muxing processor servicing as 3 dB-hybrid followed by an element that adjusts the amplitude (A) and phase (Φ) of signal. This A & Φ adjustment element ensures that the LP ground terminal transmits RHCP and LHCP waveforms.

FIG. 5 depicts a LP ground terminal 510 that comprises a wavefront muxing processor with function of 3 dB-hybrid, amplitude (A) and phase ($\Phi$) adjustment element (namely, an equalizer) and a horn with VP and HP feeds. Due to the relative differential amplifications and phase delays between HP path and those in VP path, amplitude (A) and phase ($\Phi$) adjustment (namely, equalization) is required. The A and $\Phi$ adjustment ensures that CP waveforms, one of which is RHCP and another is LHCP, are transmitted. Without A and $\Phi$ adjustment, RHCP and LHCP waveforms would become RHEP and LHEP ones, which would further introduce unwanted interference in LHCP and RHCP channels, respectively.

Figure 6:
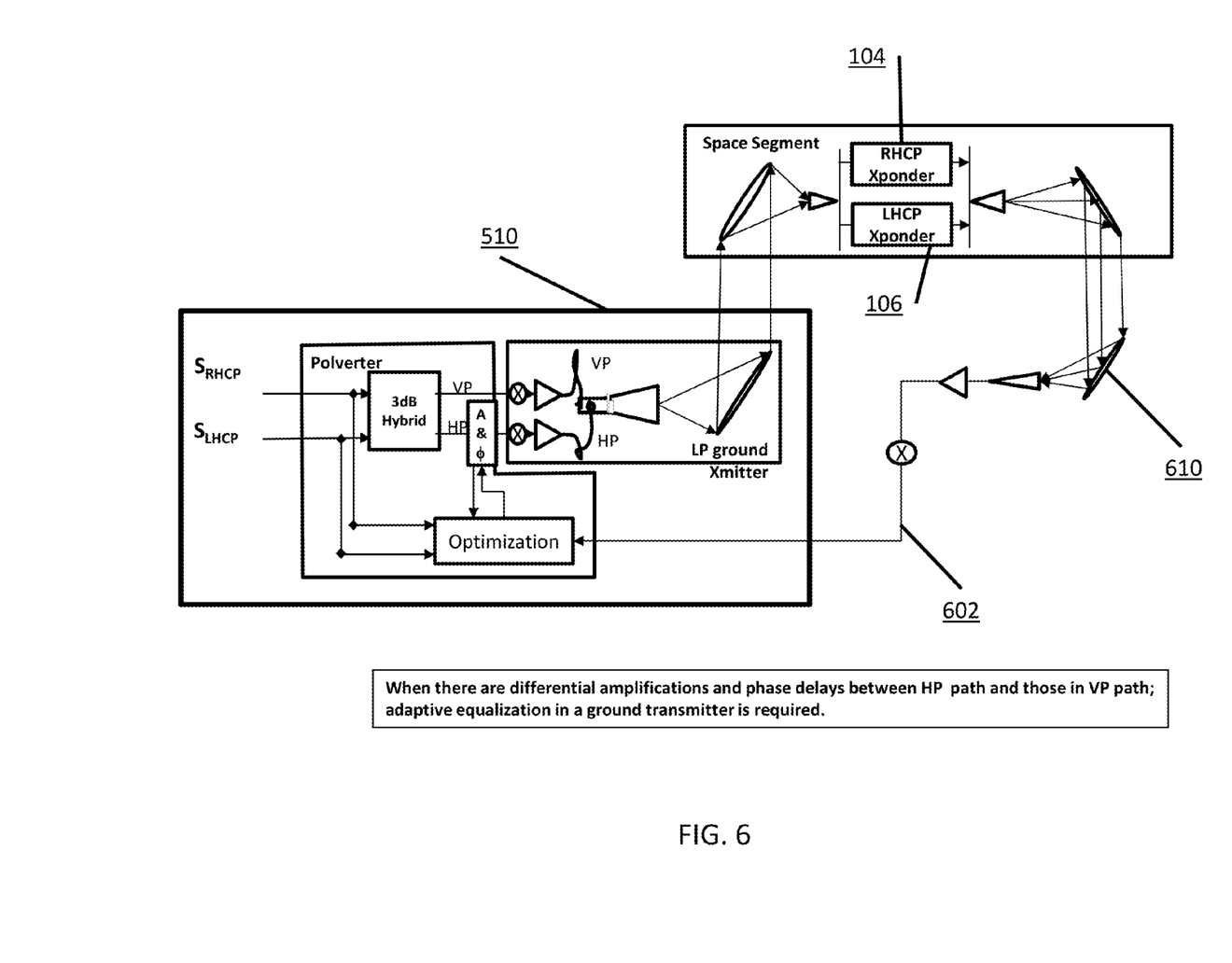
FIG. 6 depicts (1) a LP ground terminal that transmits CP waveforms and has 3 dB-hybrid and optimization elements for facilitating A & Φ adjustment, (2) CP transponders and (3) feedback receiving terminal sending RHCP data stream to the transmitting LP ground terminal through separate dedicated channels.

FIG. 6 depicts an application of the invention disclosed herein. A LP ground terminal 510 comprises a wavefront muxing processor with function of 3 dB-hybrid, amplitude (A) and phase ($\Phi$) adjustment element (namely, an equalizer), an optimization element and a horn with VP and HP feeds. The LP ground terminal 510 is configured to (1) access CP space segment with RHCP transponder 104 and LHCP transponder 106, and to (2) receive RHCP signal 602 from a feedback aperture 610 co-located with the terminal 510. The terminal 510 resembles conventional LP terminals, but has additional function "Polverter" that (1) serves as a polarization-conversion element, and (2) comprises a wavefront muxing processor with function of 3 dB-hybrid, amplitude (A) and phase (Φ) adjustment element (namely, an equalizer) and an optimization element. The "Polverter" function may be implemented in, for instance, software. "Polverter" can be configured, as shown in FIG. 6, such that (1) two signals $S_{RHCP}$ and $S_{LHCP}$ are transformed and conditioned in VP and HP formats via wavefront muxing, (2) the relative differential amplifications and phase delays between HP path and those in VP path are compensated by the A and Φ adjustment element, and (3) the optimization element computes the optimal weight for A and Φ adjustment.

In FIG. 6, the optimal state (1) allows the $S_{RHCP}$ signal to only pass through the RHCP transponder 104 without introducing significant interference to the LHCP transponder 106, and (2) allows the $S_{LHCP}$ signal to only pass through the LHCP transponder 106 without introducing significant interference to the RHCP transponder 104. Before the optimal state is attained, the differential amplitude (A) and phase (Φ) have not been compensated appropriately, and leakage can appear at the transponders such that (1) the $S_{RHCP}$ signal introduces significant interference to the LHCP transponder, and (2) the $S_{LHCP}$ signal also introduces significant interference to the RHCP transponder.

To lower the interference of $S_{LHCP}$ to the RHCP transponder, the LP ground terminal 510 can be configured such that the input of the wavefront muxing processor for the signal $S_{RHCP}$ is grounded. Before the optimal state is attained, the signal $S_{LHCP}$ appears at the LHCP transponder as the primary signal and also becomes interference at the RHCP transponder. The leakage of $S_{LHCP}$ then appears at the feedback aperture 610 and the feedback signal 602. When the leakage of $S_{LHCP}$ is significant, the correlation between the feedback signal 602 and the signal $S_{LHCP}$ by itself, cached by the optimization element, becomes high. Adaptive A and 1 adjustment (namely, equalization) is required to compute the optimal weight for A and 1 adjustment that (1) minimizes the leakage of $S_{LHCP}$ at the RHCP transponder 104 and the feedback aperture 610 and (2) further minimizes the correlation between the feedback signal 602 and the signal $S_{LHCP}$ by itself, which is cached by the optimization element. This procedure not only calibrates the leakage effect introduced by the differential amplitude (A) and phase (Φ), but also minimizes this leakage through computation of optimal weight for A and Φ adjustment.

Figure 7:
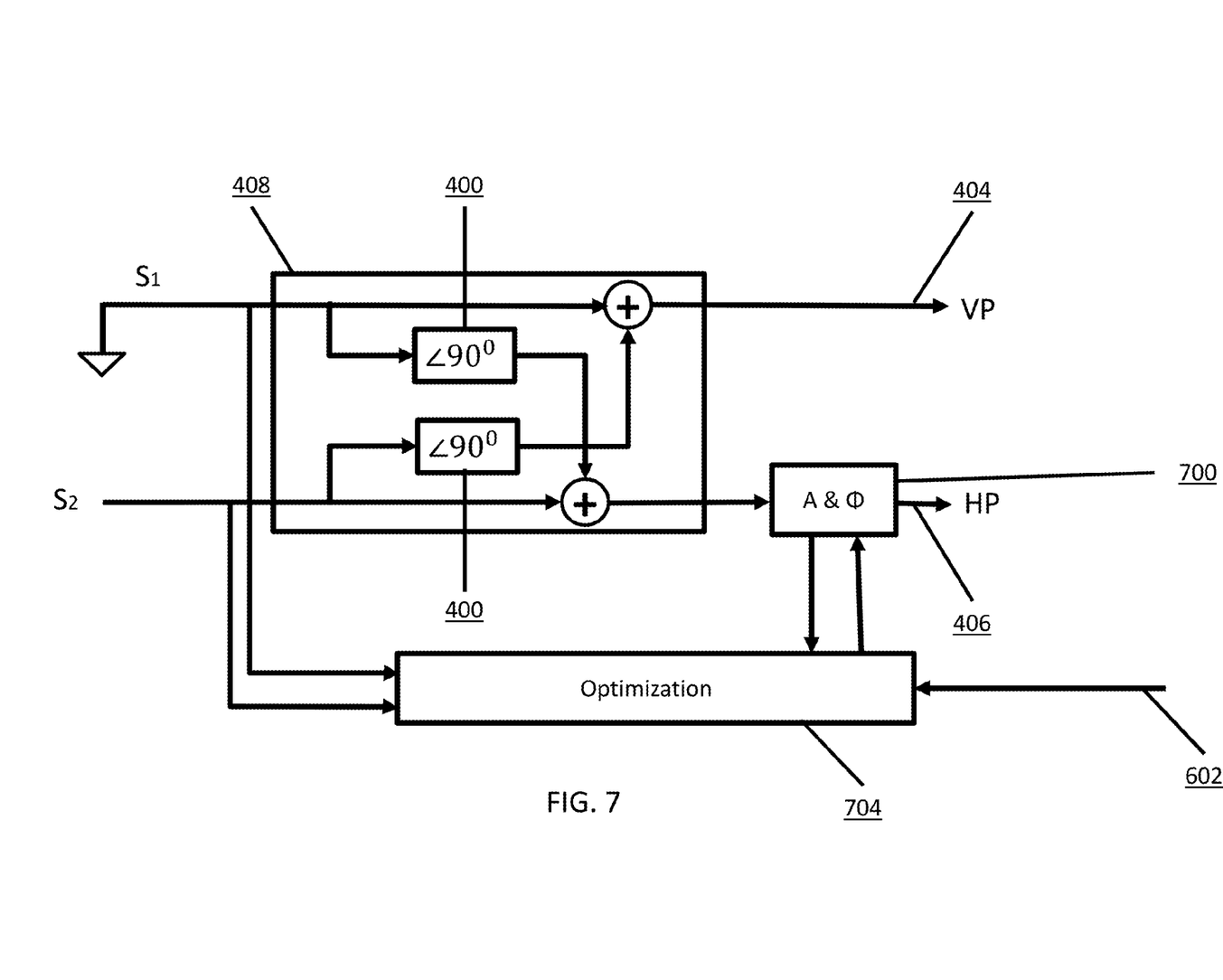
FIG. 7 depicts one configuration of the polarization-conversion element, which comprises a wavefront muxing processor serving as 3 dB-hybrid, A & Φ adjustment element and optimization element. This polarization-conversion element is configured to ensure that its host LP ground terminal, while receiving data stream from the feedback terminal, transmits LHCP waveform that has low interference to the RHCP channel.

FIG. 7 depicts the diagram within the "Polverter" function for those applications alike that in FIG. 6. The wavefront muxing processor 408 has one grounded input $S_1$ that resembles the signal $S_{RHCP}$, and a second input $S_2$ that resembles the signal $S_{LHCP}$. The wavefront muxing processor 408 has function of 3 dB-hybrid equipped with phase-shifting devices 400. If there is imbalance between the HP and the VP paths, there is a requirement of compensation on amplification and phase delay of both paths. Let a complex-valued parameter α denote the relative imbalance of amplification and phase delay on the HP path with respect to the VP path. Before the optimal state is attained, without loss of generality, the VP-output 404 can still be treated as $(S_1+iS_2)/\sqrt{2}v$, and the HP-output 406 can be represented by $\alpha(S_2+iS_1)\sqrt{2}h$. Effectively, the $S_1$ signal appears in the format $S_1v+i\alpha S_1h$, which indicates a right-hand elliptically-polarized (RHEP) waveform. Concurrently, the $S_2$ signal appears in the format $i\alpha S_2v+S_2h$, which indicates a left-hand elliptically-polarized (LHEP) waveform. It is necessary to minimize the leakage effect introduced by the imbalance parameter α in order to ensure (1) the amplitude (A) and phase (Φ) adjustment element 700 makes use of the optimal weighting factor computed by the optimization element 704, and (2) the feedback signal 602 diminishes such that its correlation with the $S_2$ signal is significantly lower than a level.

Figure 8:
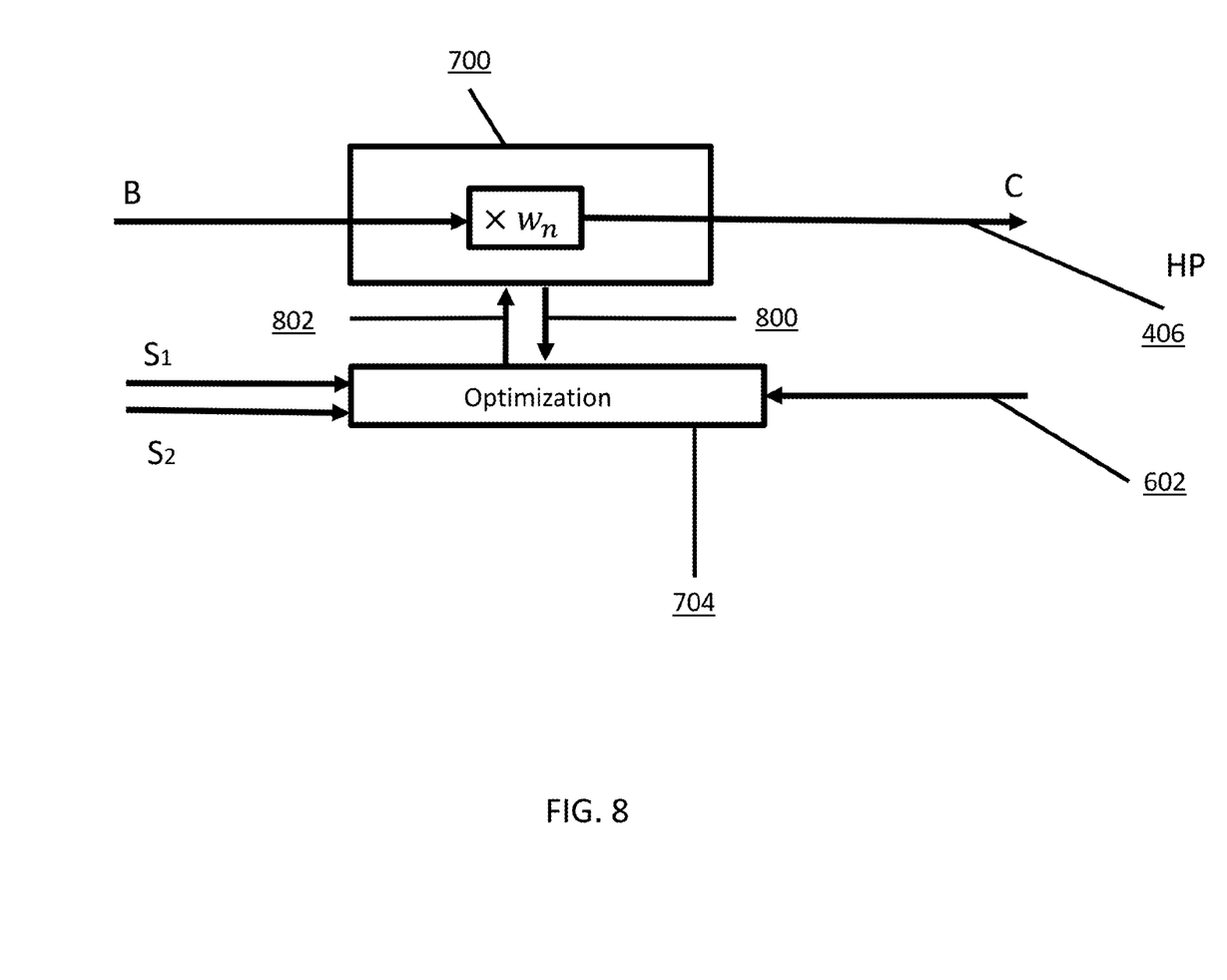
FIG. 8 depicts an A & Φ adjustment element that (1) multiplies the input data stream with a complex-valued weight, (2) sends current complex-valued weight to the optimization element, and (3) receives updated complex-valued weight from the optimization element.

FIG. 8 depicts the functional relation between the amplitude (A) and phase (Φ) adjustment element 700 and the optimization element 704. The input B of the A and Φ adjustment element 700 represents one weighted sum $\alpha(S_2+iS_1)/\sqrt{2}h$. The main function of the A and Φ adjustment element 700 is to produce an output C that equals the multiplication of B and a weighting factor w, namely C=B× w. In the optimal state, the weighting factor w shall eliminates the effect of the imbalance parameter α completely, which implies w=1/α. However, α is a unknown parameter, and hence needs to be learned in an engineered process. As a matter of fact, in its optimal state, the optimization element 704 shall have zero or significantly low feedback signal 602, which shall also bear extremely low correlation with the $S_2$ signal if the host LP ground terminal is designed to only access the RHCP channel.

The optimization element 704 carries out the following routines iteratively. (1) An objective function $f_o$ is evaluated to quantify the correlation between the feedback signal 602 and the $S_2$ signal if the host LP ground terminal is designed to only access the RHCP channel; (2) the current weighting factor $w_n$ sent through interface 800 at the n-th iteration is perturbed by some variation term δw multiplied by a control factor $\beta_n$; (3) perturbed weight $w_n+\beta_n\delta w$ is computed and then sent through interface 802 to the A and Φ adjustment element 700; (4) the gradient of $f_o$, $\nabla_w f_o$, is approximated in terms of the change of $f_o$ and δw; and (5) updated weight $w_{n+1}$ for the (n+1)-th iteration is computed by $w_{n+1}=w_n+\gamma_n\nabla_w f_o$, where $\gamma_n$ is a control factor.

Embodiment 2

In another embodiment, the "Polverter" function is configured to enable transmitting LP ground terminal 510 with access only to LHCP channels while limiting the interference to RHCP channels. The "Polverter" function is configured in a way similar to FIG. 7, but its wavefront muxing processor 408 has one grounded input $S_2$ that resembles the signal $S_{LHCP}$, and a second input $S_1$ that resembles the signal $S_{RHCP}$. It is necessary to minimize the leakage effect introduced by the imbalance parameter α in order to ensure (1) the amplitude (A) and phase (Φ) adjustment element 700 makes use of the optimal weighting factor computed by the optimization element 704, and (2) the feedback signal 602 diminishes such that its correlation with the $S_1$ signal is significantly lower than a level. As a matter of fact, in its optimal state, the optimization element 704 shall have zero or significantly low feedback signal 602, which shall also bear extremely low correlation with the $S_1$ signal if the host LP ground terminal is designed to only access the LHCP channel.

The optimization element 704 carries out the following routines iteratively. (1) An objective function $f_o$ is evaluated to quantify the correlation between the feedback signal 602 and the $S_2$ signal if the host LP ground terminal is designed to only access the LHCP channel; (2) the current weighting factor $w_n$ sent through interface 800 at the n-th iteration is perturbed by some variation term δw multiplied by a control factor $\beta_n$; (3) perturbed weight $w_n+\beta_n\delta w$ is computed and then sent through interface 802 to the A and Φ adjustment element 700; (4) the gradient of $f_o$, $\nabla_w f_o$, is approximated in terms of the change of $f_o$ and δw; and (5) updated weight $w_{n+1}$ for the (n+1)-th iteration is computed by $w_{n+1}=w_n+\gamma_n \nabla_w f\rule[.5ex]{1em}{.1ex}_o$, where $\gamma_n$ is a control factor.

Embodiment 3

In another embodiment, the CP channels comprise (1) communication links between the transmitting LP ground terminals 510 and CP satellites, (2) CP satellites with RHCP and LHCP transponders, (3) communication links between the CP satellites and receiving CP devices, (4) communication links between the CP satellites and the receiving feedback CP aperture 610 and (5) communication links between the receiving feedback CP terminals and the LP ground terminals 510.

The "Polverter" function is configured to enable transmitting LP ground terminal 510 with access only to RHCP transponder while limiting the interference to LHCP transponder. The "Polverter" function is configured in a way as shown in FIG. 7, in which wavefront muxing processor 408 has one grounded input $S_1$ that resembles the signal $S_{RHCP}$, and a second input $S_2$ that resembles the signal $S_{LHCP}$. It is necessary to minimize the leakage effect introduced by the imbalance parameter α in order to ensure (1) the amplitude (A) and phase (Φ) adjustment element 700 makes use of the optimal weighting factor computed by the optimization element 704, and (2) the feedback signal 602 diminishes such that its correlation with the $S_2$ signal is significantly lower than a level. As a matter of fact, in its optimal state, the optimization element 704 shall have zero or significantly low feedback signal 602, which shall also bear extremely low correlation with the $S_2$ signal if the host LP ground terminal is designed to only access the RHCP transponder.

Embodiment 4

In another embodiment, the "Polverter" function is configured to enable transmitting LP ground terminal 510 with access only to LHCP transponder while limiting the interference to RHCP transponder. The "Polverter" function is configured in a way similar to FIG. 7, in which wavefront muxing processor 408 has one grounded input $S_2$ that resembles the signal $S_{LHCP}$, and a second input $S_1$ that resembles the signal $S_{RHCP}$. It is necessary to minimize the leakage effect introduced by the imbalance parameter α in order to ensure (1) the amplitude (A) and phase (Φ) adjustment element 700 makes use of the optimal weighting factor computed by the optimization element 704, and (2) the feedback signal 602 diminishes such that its correlation with the $S_1$ signal is significantly lower than a level. As a matter of fact, in its optimal state, the optimization element 704 shall have zero or significantly low feedback signal 602, which shall also bear extremely low correlation with the $S_1$ signal if the host LP ground terminal is designed to only access the LHCP transponder.

Embodiment 5

Figure 9:
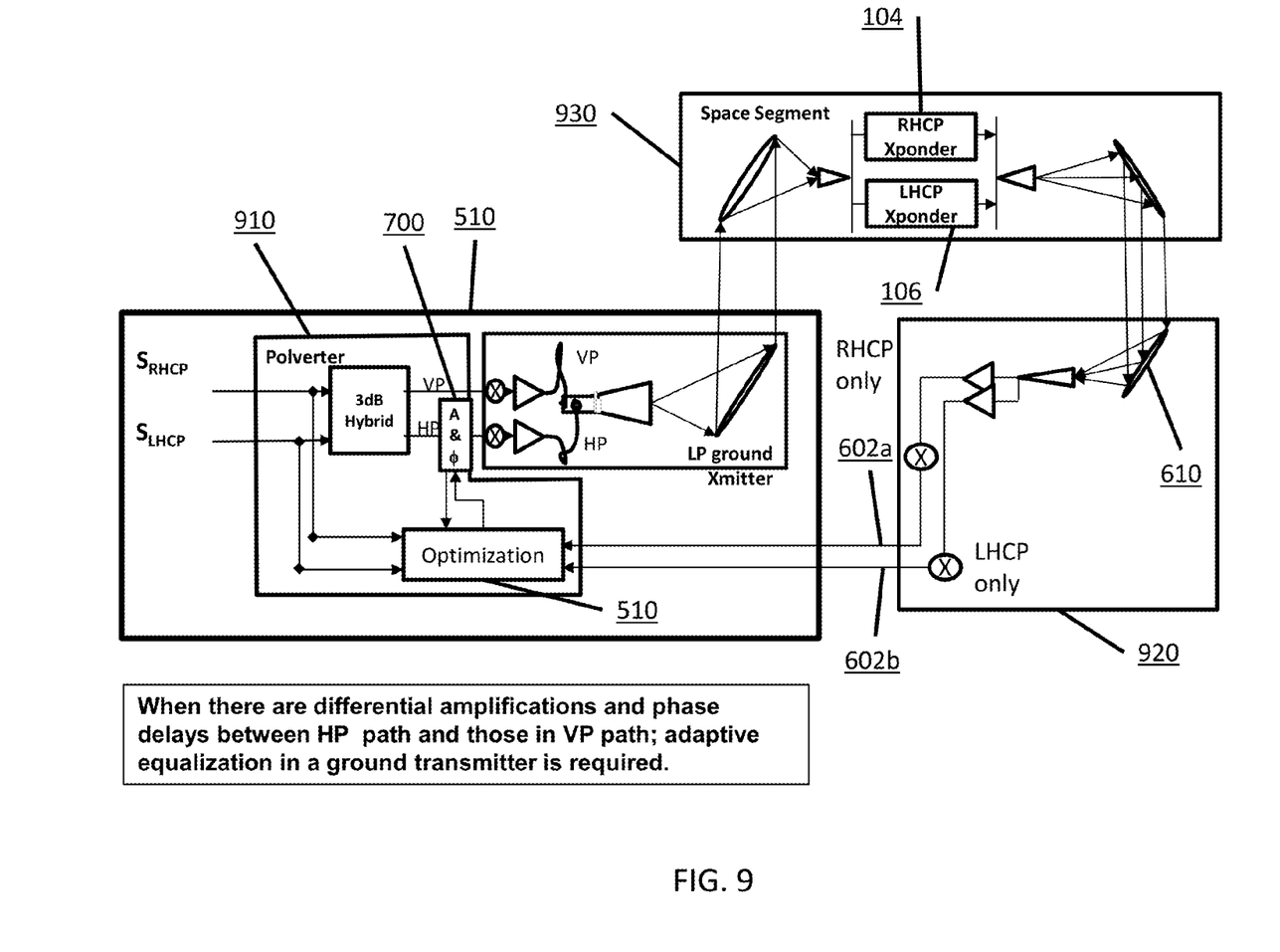
FIG. 9 depicts (1) a LP ground terminal that transmits CP waveforms and has 3 dB-hybrid and optimization elements for facilitating A & Φ adjustment, (2) CP transponders and (3) feedback receiving terminal sending RHCP data stream to the transmitting LP ground terminal through one dedicated channel and sending LHCP data stream to the transmitting LP ground terminal through another dedicated channel.

In another embodiment, the "Polverter" function is configured to enable transmitting LP ground terminal 510 with separate access to RHCP and LHCP transponders independently. The "Polverter" function 910 is configured in a way as shown in FIG. 9, in which wavefront muxing processor 408 has one input $S_1$ that resembles the signal $S_{RHCP}$, and a second input $S_2$ that resembles the signal $S_{LHCP}$. Without the amplitude (A) and phase (Φ) adjustment element 700, the signal $S_{RHCP}$ would become RHEP and introduce interference to the LHCP transponder, and likewise the signal $S_{LHCP}$ would become LHEP and introduce interference to the RHCP transponder. It is necessary to minimize the leakage effects introduced by the imbalance parameter α in order to ensure (1) the amplitude (A) and phase (Φ) adjustment element 700 makes use of the optimal weighting factor computed by the optimization element 704, (2) the feedback signal 602a sent by the CP feedback unit 920 diminishes such that its correlation with the $S_2$ signal is significantly lower than a level, and, (3) the feedback signal 602b sent by the CP feedback unit 920 diminishes such that its correlation with the $S_1$ signal is significantly lower than a level. As a matter of fact, in its optimal state, the optimization element 704 shall (1) have zero or significantly low feedback signal 602a, which shall also bear extremely low correlation with the $S_2$ signal if the $S_1$ signal is authorized to only pass through the RHCP transponder, and (2) have zero or significantly low feedback signal 602b, which shall also bear extremely low correlation with the $S_1$ signal if the $S_2$ signal is authorized to only pass through the LHCP transponder.

Embodiment 6

In another embodiment, the CP channels comprise (1) communication links between the transmitting LP ground terminals 510 and CP unmanned aerial vehicles (UAVs), (2) CP UAVs with RHCP and LHCP communication assets, (3) communication links between the CP UAVs and receiving CP devices, (4) communication links between the CP UAVs and the receiving feedback CP terminals 610 and (5) communication links between the receiving feedback CP terminals and the LP ground terminals 510.

The "Polverter" function has various configurations to enable transmitting LP ground terminal 510 with access to CP UAVs. In a first configuration, the "Polverter" function is configured in a way as shown in FIG. 7, in which wavefront muxing processor 408 has one grounded input $S_1$ that resembles the signal $S_{RHCP}$, and a second input $S_2$ that resembles the signal $S_{LHCP}$. It is necessary to minimize the leakage effect introduced by the imbalance parameter α in order to ensure (1) the amplitude (A) and phase (Φ) adjustment element 700 makes use of the optimal weighting factor computed by the optimization element 704, and (2) the feedback signal 602 diminishes such that its correlation with the $S_2$ signal is significantly lower than a level. As a matter of fact, in its optimal state, the optimization element 704 shall have zero or significantly low feedback signal 602, which shall also bear extremely low correlation with the $S_2$ signal if the host LP ground terminal is designed to only access the RHCP communication assets of UAVs.

In a second configuration, the "Polverter" function is configured in a way similar to FIG. 7, in which wavefront muxing processor 408 has one grounded input $S_2$ that resembles the signal $S_{LHCP}$, and a second input $S_1$ that resembles the signal $S_{RHCP}$. It is necessary to minimize the leakage effect introduced by the imbalance parameter α in order to ensure (1) the amplitude (A) and phase (Φ) adjustment element 700 makes use of the optimal weighting factor computed by the optimization element 704, and (2) the feedback signal 602 diminishes such that its correlation with the $S_1$ signal is significantly lower than a level. As a matter of fact, in its optimal state, the optimization element 704 shall have zero or significantly low feedback signal 602, which shall also bear extremely low correlation with the $S_1$ signal if the host LP ground terminal is designed to only access the LHCP communication assets of UAVs.

In a third configuration, the "Polverter" function is configured in a way as shown in FIG. 9, in which wavefront muxing processor 408 has one input $S_1$ that resembles the signal $S_{RHCP}$, and a second input $S_2$ that resembles the signal $S_{LHCP}$. Without the amplitude (A) and phase (Φ) adjustment element 700, the signal $S_{RHCP}$ would become RHEP and introduce interference to the LHCP transponder, and likewise the signal $S_{LHCP}$ would become LHEP and introduce interference to the RHCP transponder. It is necessary to minimize the leakage effects introduced by the imbalance parameter α in order to ensure (1) the amplitude (A) and phase (Φ) adjustment element 700 makes use of the optimal weighting factor computed by the optimization element 704, (2) the feedback signal 602a diminishes such that its correlation with the $S_2$ signal is significantly lower than a level, and, (3) the feedback signal 602b diminishes such that its correlation with the $S_1$ signal is significantly lower than a level. As a matter of fact, in its optimal state, the optimization element 704 shall (1) have zero or significantly low feedback signal 602a, which shall also bear extremely low correlation with the $S_2$ signal if the $S_1$ signal is authorized to only pass through the RHCP communication assets of UAVs, and (2) have zero or significantly low feedback signal 602b, which shall also bear extremely low correlation with the $S_1$ signal if the $S_2$ signal is authorized to only pass through the LHCP communication assets of UAVs.

Embodiment 7

Referring to FIG. 9, a communications system comprises mainly (1) a linearly-polarized (LP) transmitting terminal 510 transmitting a horizontally polarized (HP) signal through a HP port and a vertically polarized (VP) signal through a VP port at a common frequency slot through circularly-polarized (CP) channels 104 and 106; (2) a polarization-conversion element 910, or "Polverter" function, in the transmitting LP terminal modifying the relative amplitude and phase of the HP and the VP signals by the amplitude (A) and phase (4:1)) adjustment element 700; and (3) a circularly-polarized (CP) feedback unit 920 with a receiving aperture 610 receiving feedback signals from said CP channels 602a and 602b. In a perfect world, the output of a RHCP transponder 104 and that of a LHCP transponder 106 for a CP transponding satellite 930 should feature, respectively, only amplified and frequency translated signals from $S_{RHCP}$ and $S_{LHCP}$, namely the two CP inputs in the ground transmitter 510. In a real world, both transponders will have leakages from the other CP channel in a common frequency slot due to propagation differentials both in amplitudes and phases among devices and in-space in the two CP channels. The "Polverter" function 910 on the ground transmitting site will perform pre-compensation iteratively to equalize the propagation amplitude and phase differentials, minimizing or eliminating the leakage signals or interferences.

The communications system may become a terminal with combining functions of the CP feedback unit 920 and those of the transmitting LP terminal 910. The terminal with combined function will be performing the LP signals to the CP channels 104 and 106 while receiving feedback signals from the CP channels 602a and 602b. It is also possible to have a separated terminal, which may have a mode for performing all functions of the CP feedback unit 920, which will be relayed back to the terminal 510 with all transmitting functions.

The communications system further comprises methods of transmitting a first signal $S_{RHCP}$ in right-hand circularly-polarized (RHCP) formats through a 3 dB hybrid with functions of multiplying the first signal by a first complex weighting factor and transmitting the first weighted first signal through said VP feed port; and multiplying the first signal by a second complex weighting factor and transmitting the second weighted first signal through said HP feed port. Similarly the communications system also comprises methods of transmitting a second signal $S_{LHCP}$ in left-hand circularly-polarized (LHCP) formats through the same 3-dB hybrid with functions of multiplying the second signal by a third complex weighting factor and transmitting the first weighted second signal through the VP feed port; and multiplying the second signal by a fourth complex weighting factor and transmitting the second weighted second signal through the HP feed port.

It is also possible to configure the communications system to further comprise methods of concurrently transmitting a first signal $S_{RHCP}$ in RHCP and a second signal $S_{LHCP}$ in LHCP formats through the same 3 dB hybrid with functions of (1) multiplying said first signal $S_{RHCP}$ by a first complex weighting factor and the second signal $S_{LHCP}$ by a third complex weighting factor, then transmitting the first weighted sum of the first weighted first signal and the third weighted second signal through said VP feed port; and (2) multiplying the first signal $S_{RHCP}$ by a second complex weighting factor and the second signal $S_{LHCP}$ by a fourth complex weighting factor, then transmitting a second weighted sum of the second weighted first signal and the fourth weighted second signal through the HP feed port.

Furthermore in the communications system, it is also possible to transmit a first signal $S_{RHCP}$ at a normal power level $P_0$ radiating through a RHCP channel and transmitting a second signal $S_{LHCP}$ at a power level less than $P_0$–10 dB through a LHCP channel among the CP channels from the transmitting LP ground terminal at said common frequency slot. The communications system further comprises methods of radiating signal from the transmitting LP ground terminal to a desired CP satellite.

The 3-dB hybrid in the polarization-conversion element in the transmitting LP ground terminal may be implemented by software functions comprising methods of processing a first input $S_{RHCP}$ and a second input $S_{LHCP}$, and outputting a first output signal for HP port transmitting and a second output signal for VP port transmitting. In addition, following the 3 dB hybrid, its two outputs are subjected for further processing by an equalizer preprocessing for equalization of path differentials. The first output signal of the equalizer comprised a weighted sum from said first input VP weighted by a first complex weight and said second input HP weighted by a second complex weight; and the second output comprising another weighted sum from said first input VP weighted by a third complex value and said second input HP weighted by a fourth complex value. In FIG. 9, the equalizer shown features a single complex multiplication on the HP output arm of an idealized 3-dB hybrid. It is also using the VP arm for signal amplitude and phase references in the equalization process by assigning the first 3 from the 4 complex weights to zero.

The methods for said polarization-conversion element further comprise methods of calculating and optimizing the first, the second, the third, and the fourth complex weights by an optimization processor by (1) inputting a third input in a RHCP format, received by a feedback CP unit 920 and duplicating said second input $S_{LHCP}$, and then performing correlation calculation between the third input and the duplicated second input, (2) then converting the correlation calculation results into a current total cost through a mapping process, (3) measuring gradient of said total cost, and finally deriving new weights according to optimization algorithms for next weighting update. The mapping process can be implemented as a table look-up, converting sets of "observable" into sets of "measurable." The weight optimization in the polarization-conversion element further comprises methods of minimizing the total cost between the second and the third inputs for iteratively updating and optimizing the complex weights.

The polarization-conversion element may also comprises methods of calculating correlation between a third input in a LHCP format sent by the CP feedback channel 602b, and the duplicated second input data stream $S_{LHCP}$, wherein methods of duplication further comprising of caching said second to-be-LHCP-formatted-input $S_{LHCP}$ in the transmitting LP ground terminal The communications system will allow a transmitting terminal 510 radiating a desired communications signal to a LHCP channel as a desired channel and radiating a low intensity probing reference signal to a RHCP channel among the CP channels 104 and 106 in the common frequency slot. The communications system further comprises methods of radiating low power level interference through the transmitting LP ground terminal 510 to a RHCP channel 104 or a LHCP channel 106 among many CP channels.

The polarization-conversion element 910 may further comprise methods of (1) receiving a first input $S_{RHCP}$ through replicating RHCP components of transmitting signals of the LP transmitting terminal 510, (2) receiving a second input $S_{LHCP}$ by replicating LHCP components of transmitting signals of the LP transmitting terminal 510, (3) receiving a third input via replicating received RHCP signals 602a of the CP feedback unit 920, (4) receiving a fourth input by replicating LHCP received signals 602b of said CP feedback unit 920. The polarization-conversion element 910 then calculates current first correlations between the first input and the third input, and second correlations between the first input and the fourth input. The polarization-conversion element 910 also calculates third correlations between the second input and the third input, and fourth correlations between the second input and the fourth input.

The communications system transmits through many CP channels; some of the CP channels may go through CP satellite transponders 104 and 106 for satellite communications. The methods of receiving feedback signals from the CP channels 602a and 602b will comprise methods of receiving signals through CP satellite transponders 104 and 106.

The proposed systems are applicable to many terrestrial applications. The methods for transmitting through CP channels may comprising methods of transmitting to CP ground terminals via terrestrial based or airborne CP channels. The communications system for transmitting through CP channels may further comprise methods of transmitting through transponders in UAVs. The UAVs may feature RHCP and LHCP communication assets. On the other hand, the communications system of transmitting through CP channels may further comprise methods of transmitting through multiple LP transponders in UAVs, wherein each of said UAVs comprising VP or HP communication assets.

REFERENCE

1. U.S. Pat. No. 8,538,326 B2, "Accessing LP Transponders with CP Terminals via Wavefront Multiplexing Techniques", issued on Sep. 17, 2013.

What is claimed is:

1. An apparatus comprising:
   a wavefront muxing processor receiving first and second input signals to generate first and second output signals on first and second communication channels, respectively, the first and second output signals being at a common frequency slot and having relative differential amplitude and phase delays; and
   an amplitude and phase adjustment element located at one of the first and second communication channels to adjust the relative differential amplitude and phase delays using an adjustment amount to reduce interference in the first and second communication channels,
   wherein the first output signal is a weighted sum of the first input signal and the second input signal that is phase shifted by a second phase shift,
   wherein the second output signal is a weighted sum of the second input signal and the first input signal that is phase shifted by a first phase shift,
   wherein the first and second output signals are transmitted to a transponder.

2. The apparatus of claim 1 wherein the first and second input signals correspond to right-hand and left-hand circularly polarized, respectively.

3. The apparatus of claim 1 wherein the first and second output signals correspond to vertically and horizontally polarized, respectively.

4. The apparatus of claim 1 wherein one of the first and second phase shifts is approximately ninety degrees.

5. The apparatus of claim 1 further comprising an optimizing element to optimize weights for the adjustment amount using at least one feedback signal from a feedback aperture that receives signals from the transponder.

6. The apparatus of claim 5 wherein the optimizing element reduces a correlation of the at least one feedback signal with one of the first and second input signals to below a predetermined threshold.

7. The apparatus of claim 6 wherein the optimizing element reduces the correlation using an iterative procedure based on a perturbation value, a control factor, and a gradient of an objective function that quantifies the correlation.

8. A linearly polarized transmitting terminal comprising:
   a polarization converter to convert polarization of first and second input signals to first and second output signals, the polarization converter comprising:
      a wavefront muxing processor receiving first and second input signals to generate first and second output signals on first and second communication channels, respectively, the first and second output signals being at a common frequency slot and having relative differential amplitude and phase delays; and
      an amplitude and phase adjustment element located at one of the first and second communication channels to adjust the relative differential amplitude and phase delays using an adjustment amount to reduce interference in the first and second communication channels,
      wherein the first output signal is a weighted sum of the first input signal and the second input signal that is phase shifted by a second phase shift,
      wherein the second output signal is a weighted sum of the second input signal and the first input signal that is phase shifted by a first phase shift; and
   a transmitter having first and second feeds to transmit the first and second output signals, respectively to a transponding satellite.

9. The transmitting terminal of claim 8
   wherein the first and second input signals correspond to right-hand and left-hand circularly polarized, respectively, and
   wherein the first and second output signals correspond to vertically and horizontally polarized, respectively.

10. The transmitting terminal of claim 8 wherein the polarization converter further comprises:

an optimizing element to optimize weights for the adjustment amount using at least one feedback signal from a feedback aperture that receives signals from the transponding satellite.

11. A method comprising:
receiving first and second input signals to generate first and second output signals on first and second communication channels, respectively, using a wavefront muxing processor, the first and second output signals being at a common frequency slot and having relative differential amplitude and phase delays; and
adjusting the relative differential amplitude and phase delays using an adjustment amount to reduce interference in the first and second communication channels,
wherein the first output signal is a weighted sum of the first input signal and the second input signal that is phase shifted by a second phase shift,
wherein the second output signal is a weighted sum of the second input signal and the first input signal that is phase shifted by a first phase shift,
wherein the first and second output signals are transmitted to a transponder.

12. The method of claim 11 wherein the first and second input signals correspond to right-hand and left-hand circularly polarized, respectively.

13. The method of claim 11 wherein the first and second output signals correspond to vertically and horizontally polarized, respectively.

14. The method of claim 11 wherein one of the first and second phase shifts is approximately ninety degrees.

15. The method of claim 11 further comprising optimizing weights for the adjustment amount using at least one feedback signal from a feedback aperture that receives signals from the transponder.

16. The method of claim 15 wherein optimizing comprises reducing a correlation of the at least one feedback signal with one of the first and second input signals to below a predetermined threshold.

17. The method of claim 16 wherein reducing the correlation comprises using an iterative procedure based on a perturbation value, a control factor, and a gradient of an objective function that quantifies the correlation.

* * * * *